Figure 1A:
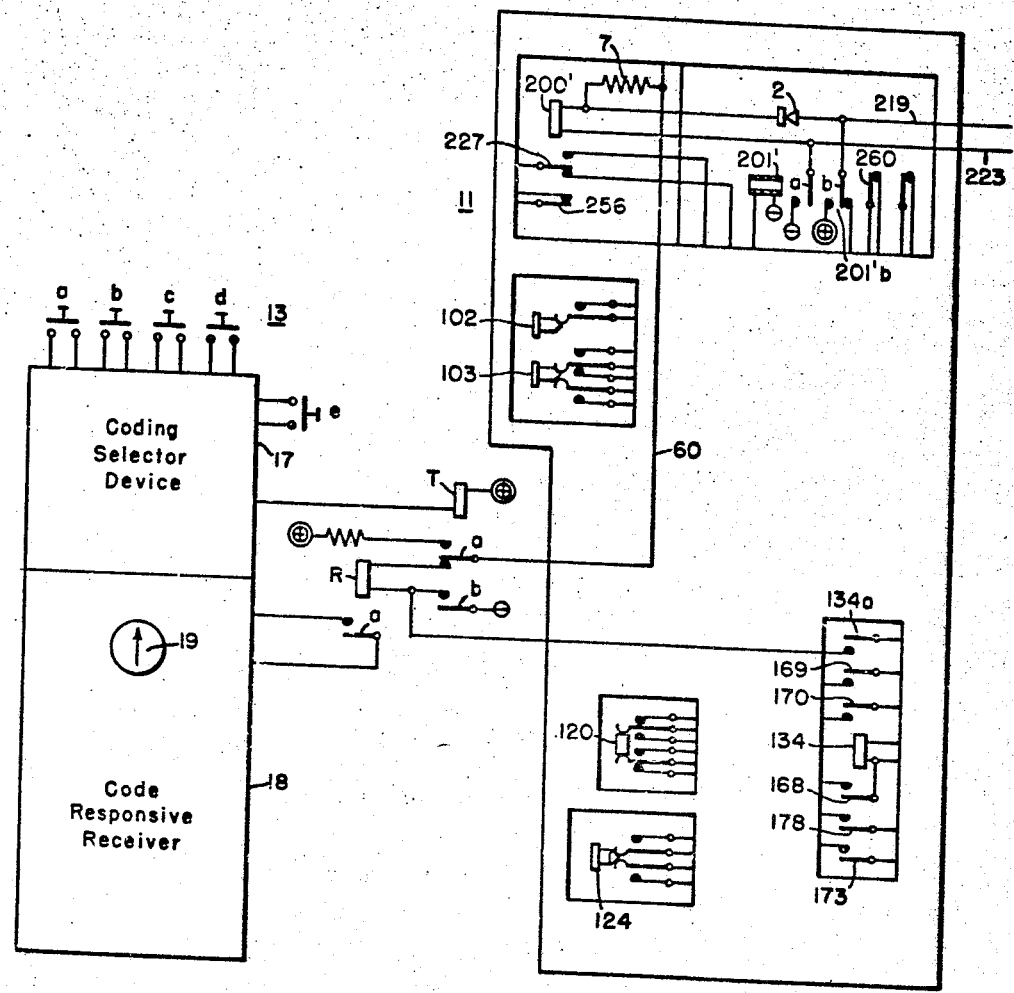

June 19, 1962     W. A. DERR ET AL     3,040,297
SUPERVISORY CONTROL AND REMOTE METERING Filed May 28, 1956     2 Sheets-Sheet 1

WITNESSES
Robert C. Baird
Leon J. Taza

INVENTORS
Weldon L. Metz &
Willard A. Derr.
BY
Francis V.B. Giolma
ATTORNEY

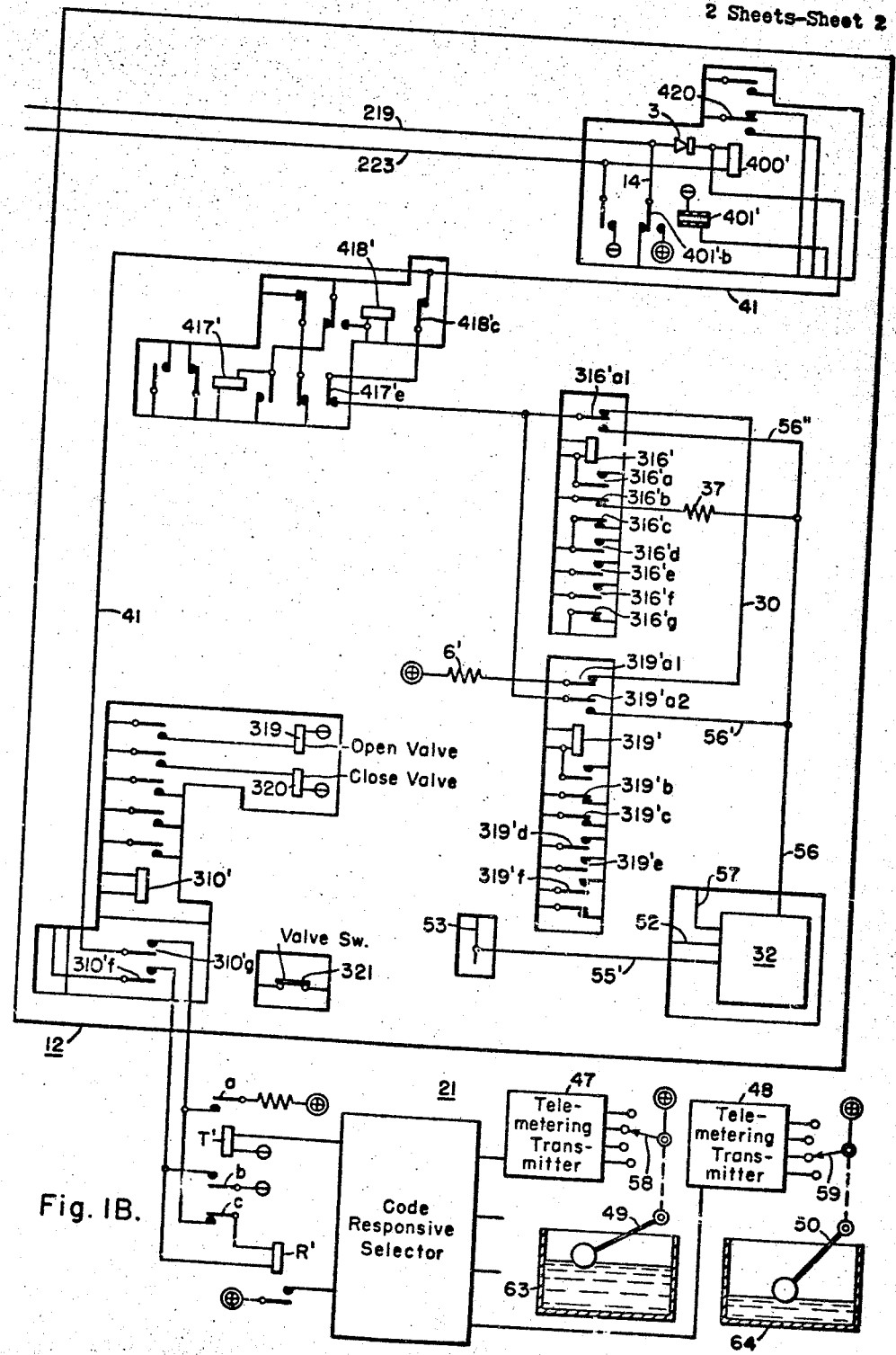
Fig. IB.

United States Patent Office 3,040,297
Patented June 19, 1962

3,040,297
SUPERVISORY CONTROL AND REMOTE METERING
Willard A. Derr, Pittsburgh, and Weldon L. Metz, Penn Township, Allegheny County, Pa., assignors to Westinghouse Electric Corporation, East Pittsburgh, Pa., a corporation of Pennsylvania
Filed May 28, 1956, Ser. No. 587,570
10 Claims. (Cl. 340—150)

Our invention relates generally to remote control systems, and it has reference in particular to supervisory control and remote metering apparatus.

Generally stated, it is an object of our invention to provide an improved supervisory control and remote metering system which is simple and inexpensive to build and is reliable in operation.

More specifically, it is an object of our invention to provide in a supervisory control system for selecting a remote station by means of signals of one characteristic, and then selecting one of a plurality of metering points at such station by means of signals of a different characteristic.

It is one object of our invention to provide for selecting a particular point at a remote station by means of coded signals sent and received over a signal channel by supervisory control equipment at a dispatching office and the remote station to connect metering means to the channel at the dispatching office and remote station, and then for selecting through operation of the metering means one of a plurality of metering circuits at such point by means of coded signals sent and received by the different metering means without operating the supervisory equipment.

Another object of our invention is to provide in a supervisory control system for selecting a point at a remote station through operation of the usual supervisory sending and receiving relays by means of signals sent over a single pair of line wires, and for further selecting one of a number of metering points connected to the remote point by means of signals which are applied to the line wires in series with, yet do not operate the supervisory receiving relays.

Yet another object of our invention is to provide in a remote control and metering system for selecting a control point at a remote station by means of coded signals of one polarity through operation of the supervisory control equipment, and for using signals of the opposite polarity to select a particular metering point at the remote station and effect operation of a metering transmitter at such metering point to transmit coded signals of said opposite polarity to operate a metering receiver at the dispatching office.

Other objects will, in part, be obvious and will, in part, be explained hereinafter.

In practicing our invention in accordance with one of its embodiments, coded pulse signals of one polarity are applied to a signal channel by means of supervisory control sending means to operate supervisory control line relays at the dispatching office and remote station in a supervisory control system to select any one of a number of control points at a remote station. Upon selection of the particular control point, a metering selector and receiver is connected to the signal channel across a rectifier device in series with the supervisory control line relay to transmit pulses of the opposite polarity to a metering selector at the remote station, which is likewise connected across a rectifier device in series with the remote station supervisory control line relay for selecting at a tank group a particular tank whose level is to be metered. A digital converter at the particular tank operated by a float controls a telemetering transmitter coding device which transmits a code of the reverse polarity, which is received at the dispatching office by a metering receiver which indicates the level of the particular tank being metered.

For a more complete understanding of the nature and scope of our invention, reference may be made to the following detailed description which may be read in connection with the accompanying drawings, in which:

FIGS. 1A and 1B taken together provide a schematic diagram of a remote metering system embodying the invention in one of its forms;

FIG. 1A being a schematic diagram of supervisory control equipment and metering means at a dispatching office in the system, and FIG. 1B being a schematic diagram of supervisory control and metering equipment at a remote station associated in the system with the equipment of FIG. 1A.

Referring to the drawings, the reference numerals 11 and 12 denote generally dispatching office supervisory control equipment and remote station supervisory control equipment which correspond, respectively, to the apparatus of FIGS. 1 and 2, and FIGS. 3, 4 and 5 of Patent No. 2,597,075, which issued on May 20, 1952, to Willard A. Derr. The equipments 11 and 12 are substantially identical with the equipments shown in detail in the Derr patent and are therefore shown in outline form only, with only those relays of the Derr patent being shown which are necessary to explain the details of the present invention or show changes made in the circuit of the Derr patent in accomplishing the present invention. Relays which perform the same functions and are unchanged from the showing in the Derr patent are generally not shown, but where shown they bear the same designations as in the Derr patent, while relays which have been modified from the showing in the Derr patent are designated by primed numbers corresponding to the number of the Derr patent. New apparatus is designated by numerals not appearing in the Derr patent.

Referring to FIGS. 1A and 1B, it will be seen that the metering means 46 of the Derr patent has been eliminated, and a metering selector and receiver device 13 has been connected in its place so as to be connected to the signal channel through armature 134a of the point relay 134, which is operated under the control of the point selection key 124 in response to the receipt of a point selection check code from the remote station. The metering means 13 comprises a coding selector device 17 having a plurality of selector keys $a$, $b$, $c$ and $d$, which may be operated to produce different selecting codes for operating a transmitter relay T to select different ones of a plurality of telemetering transmitters at a remote metering point. A "read" pushbutton $e$ is then operated to transmit an operation pulse. The relay T through armature $a$ connects positive to conductor 223 of the signal channel through the conductor 60, resistor 7 and operating winding of the line relay 200'. Negative is connected to the conductor 219 of the signal channel through armature $b$ of relay T, armature 134a and through the circuit shown in the Derr patent to conductor 219 at armature 291'b. This applies positive and negative across the rectifier device 2 and energizes the conductors 219 and 223 with the opposite polarity with which they are energized by the supervisory control sending relay 201' at armatures $a$ and $b$. The current thus produced is below the value required to operate line relay 200' or 400' but is sufficient to operate a metering relay R' at the remote station. A receiving relay R is connected to the signal channel through armature $a$ of relay T and armature 134a of the point relay 134 when the point has been selected. Armature $a$ of relay T disconnects relay R from the signal channel when relay T is energized. The receiving relay R through its armature $a$ operates a code responsive receiver 18 in response to a signal code from the remote station to indicate by means of a pointer 19 the value of a quantity being metered at the remote station.

At the remote station a code responsive metering selector 21 is disposed to be connected to the signal channel through point relay 310' which is operated in response to selection of the particular metering point by operation of the key 124 at the dispatching office. The selector 21 is then operated by means of receiving relay R' which is connected to the conductors 219 and 223 through armature 310'f, armature 401'b and conductor 14, and through armature 310'g and conductor 41, to the upper terminal of line relay 400'. The receiving relay R' is thereby connected across the rectifier device 3, and is in effect connected in series with the line relays 200' and 400' for operation in accordance with pulses of a reverse polarity applied to the signal channel by the telemetering selector 17 at the dispatching office. The selector 21 is disposed to connect any one of a number of coding devices or telemetering transmitters represented by the transmitters 47 and 48 which are selectively operated by float devices 49 and 50 and their associated digital converters 58, 59 to produce different codes in response to the level of oil in tanks 63 and 64, respectively at a tank farm at the remote station.

The metering selector and receiver 13 at the dispatching office and the selector 21, transmitters 47 and 48, and float level determining mechanisms 49 and 50 are of a type that is commercially available, such as described in Bulletin No. VG-353 of the Shand & Jurs Co., of Berkeley, California, dated 1953.

Operation of a selected one of the telemetering transmitters effects operation of a transmitter relay T' which, at armatures a and b, connects the positive and negative battery terminals to the line conductors 223 and 219, respectively across rectifier device 3 and in series with the line relay 400'. This provides for coded signals of a reverse polarity which are below the value required to operate the line relays, and are transmitted to the dispatching office for operating the receiving relay R to actuate the indicator 19 to indicate the level of the particular tank.

The resistor 6 of the Derr patent, which provided a positive battery connection for line supervision purposes, has been replaced by a resistor 6' which is connected to the line relay 400' at the same point, but through an armature 319'a1, conductor 30, armature 316'c1, armature 417'e of the sub-station start relay 417', armature 418'c of the sub-station receiving relay 418', and conductor 41. This permits the line supervision potential to be removed whenever the remote station supervisory equipment is sending or receiving, or whenever either the relay 319' or the relay 316' is operated for effecting a continuous metering operation. The connection of the telemetering transmitter 32 has been changed from the showing of the Derr patent, with conductor 55' taking the place of conductor 55 and being connected to the conductor 53 directly, instead of through an armature of relay 310. Conductor 56, instead of being connected directly to one terminal of the line relay 400', is now connected through armatures 418'c, 417'e and either through armature 319'a2 and conductor 56', or armature 316'a1 and condenser 56", depending upon which of the metering points is selected.

In order to meter the level of the tank 63, for example, the point selection key 124 at the dispatching office is operated, and this causes a point selection code to be transmitted in the usual manner to effect operation of the point relay 310' at the remote station. Operation of the relay 310' connects the receiving relay R' to the signal channel and also initiates operation of a supervisory selection check code which is transmitted back to the dispatching office. Line supervision potential is removed by the sub-station receiving relay 418' which is energized in response to receipt of the selection code and opens armature 418'c. Relay 417' operates during sending of the selection code to interrupt the line supervision circuit at armature 417'e. Receipt of the selection check code at the dispatching office results in operation of the point relay 134 at the dispatching office, which thereupon connects the transmitting means 13 to the signal channel through armature 134a.

The selection key a of the metering coding selector device 17 is thereupon operated to transmit a selection code for selecting the tank 63. This code results in operation of the transmitter relay T which connects the conductors 219 and 223 to the negative and positive terminals of the battery at armatures b and a, respectively, each time it is operated. Relay R is disconnected from the line at armature a of relay T when it operates. This applies pulses of reverse polarity to the conductors 219 and 223 so that the receiving relay R' at the remote station is energized with each pulse in series with the line relay 400'. The pulses are of sufficient amplitude to operate the relay R' but are below the operating level for the line relay 400'.

Operation of relay R' causes the code responsive selector 21 to select the telemetering transmitter 47 associated with the tank 63. The selection code is followed by an operation pulse sent by the metering selector in response to operation of key e, and which causes the telemetering transmitter 47 to operate and transmit a plurality of pulses in accordance with the position of the float device 49. These pulses effect operation of the transmitting relay T' which connects positive and negative to the conductors 223 and 219, respectively, through armatures a and b. The receiving relay R' is disconnected from the signal channel at armature c of the transmitting relay when it operates.

Transmission of the metering pulses by the transmitter 47 effects energization of the receiving relay R at the dispatching office, opening and closing armature a and its front contact to effect operation of the telemetering receiver 18 and actuate the pointer 19 of the metering receiver 18 to indicate the level of the tank 28. Interposing relays 319 and 320, which are controlled through the point relay 310', may be utilized to open or control a valve or start a pump (not shown) used in connection with the tanks 63 and 64, through the transmission of a particular operation code, such as the close and trip breaker codes, by operation of the control key 120 and master control key 102 of the Derr patent in the usual manner, if desired. A valve switch 321 operates with the valve to initiate sending of a supervisory code similar to that described in the Derr patent. The supervisory control equipment may be reset at the end of an operation by operation of the reset key 103 of the Derr patent in the usual manner.

From the above description and the accompanying drawings, it will be apparent that we have provided for using a single signal channel for operation of both supervisory control selection and indication equipment, as well as metering selection and metering transmission. By utilizing the usual metering circuit for the transmission of both metering selection and metering indication pulses of a reverse polarity, the metering selector and transmitter are in effect connected in series with the line relays, are unaffected by supervisory signals, and do not require any control contacts to be connected in the supervisory signal channel. A reliable and effective system is thus provided utilizing a minimum of equipment.

Since certain changes may be made in the above-described construction, and different embodiments of the invention may be made without departing from the spirit and scope thereof, it is intended that all subject matter contained in the above description or shown in the accompanying drawings shall be considered as illustrative and not in a limiting sense.

We claim as our invention:

1. In supervisory control equipment, coded signal receiving and sending means connected to a signal channel at each of a dispatching office and a remote station, said signal receiving means and sending means being operable to connect the channel to a direct current source with one polarity to effect operation of the receiving means at the remote station to select different means at the remote station, a rectifier connected in series with said receiving means in a direction to pass a current of said polarity, additional sending means controlled by operation of the supervisory equipment at the dispatching office to apply control signals of a reverse polarity to the signal channel at the dispatching office, and one of said different means at the remote station connected to the signal channel by operation of the supervisory equipment to selectively perform different ones of a plurality of operations in response to said control signals of reverse polarity.

2. In a supervisory control system, supervisory sending and receiving means at each of a dispatching office and a remote station connected to a single signal channel to transmit and receive coded pulse signals of a given polarity to select a particular point at one of said stations, means including a unidirectional device in the channel at the office and station providing a circuit for a signal of reverse polarity, additional sending means at the dispatching office connected in response to selection of one such point and operable to apply a signal of reverse polarity to said circuit, and means at the remote station selectively responsive to different codes of reverse polarity connected by selection of such point to said circuit to respond to the reverse polarity signal from the dispatching office.

3. Supervisory control equipment including line relays and impulse relays connected to a signal channel at each of a dispatching office and remote station respectively responsive to a predetermined signal level and operable to apply to the channel control pulses of a predetermined polarity and signal level, rectifier means connected in the signal channel at each of the dispatching office and remote station, additional sending means at the dispatch office connected in circuit with the rectifier means at the dispatching office in response to a selective control operation of the dispatch office control equipment, said additional sending means operable to apply pulses of the opposite polarity and below said predetermined level to the channel, and means at the remote station connected in circuit with the rectifier means in response to said selective control operation and operable to selectively respond to different codes of such pulses of opposite polarity sent by said additional sending means.

4. In supervisory control equipment, sending means and receiving means including a line relay at each of two stations connected to a signal channel to respectively energize the channel with different pulse codes of one polarity and of at least a predetermined signal level and respond thereto for selecting individual ones of a plurality of a control point at one station from the other, a rectifier device connected in series with the line relay at each station to provide a circuit for pulses of said one polarity, additional sending means connected to the signal channel in shunt with the rectifier device at said other station and operable to apply pulse codes of the reverse polarity and below said predetermined signal level to the channel, code responsive means at the one station operable to selectively respond to codes of the reverse polarity and below said predetermined level, and means at said one station connecting said code responsive means in shunt with the rectifier device at said one station in response to selection of the control point to effect operation thereof.

5. Supervisory control equipment comprising, sending means operable to connect a signal channel to a direct current source to produce a point selection code signal of a predetermined value and of one polarity, a line relay connected to the signal channel operated by said code signal to control operation of the sending means, unidirectional means connected in circuit with the line relay in a direction to pass said code signal, receiving means operable to select a point corresponding to the point selection code and including means for sending a point selection check code over the signal channel to operate the line relay, control means connected to the signal channel in response to operation of the line relay by a point selection check code, said control means operable to apply across the unidirectional means different code signals of a reverse polarity and below said predetermined value, and additional receiving means connected to the channel in response to the selection of the said one point and operable to perform different ones of a plurality of operations in accordance with the code signals of the reverse polarity and below said predetermined value.

6. In a supervisory control system, supervisory control sending and receiving means at each of a dispatching office and a remote station operable to transmit and receive codes of a first type of signal over the signal channel to select and connect to the signal channel a point at the remote station, metering means at the dispatching office connected to control the signal channel in response to selection of said point and operable to transmit codes of a second type of signal over the signal channel, said second type of signal having no effect on the supervisory control sending and receiving means, a metering selector at the selected point at the remote station operable in response to coded signals of the second type to select one of a plurality of metering transmitters at said point and effect operation thereof to transmit over the channel a metering signal of the second type in accordance with the value of a quantity to be metered, and means at the dispatching office operated by said metering signal to indicate the value of the quantity metered.

7. The combination with supervisory control equipment at a dispatching office and a remote station including supervisory sending and receiving relays operable over a signal channel to produce and respond to codes of a first type of signal to select from the dispatching office one of a number of points at the remote station, of a metering selector and receiver conditioned for operation by selection of a particular point through operation of the supervisory control equipment over the channel, means operable to cause the selector to produce a selection code comprised of signals of another type, said another type having no effect on the supervisory control equipment, a remote selector at the remote station connected by selection of the particular point by signals of the one type and operated by the selection code of the said another type of signal to effect connection of one of a plurality of metering transmitters associated with said point to transmit a metering code of the said another type of signal in accordance with the value of a quantity to be metered, and means at the dispatching office operated by said metering code to effect operation of the metering receiver at the dispatching office to indicate the value of the quantity metered.

8. Remote metering apparatus comprising, supervisory control sending and receiving means at each of a dispatching office and a remote station operable to produce and respond only to codes comprised of a first type of signal to effect selection of a particular point at the remote station and to connect said point to the signal channel, a plurality of metering transmitters at said point at the remote station operable to transmit over the channel a metering code comprised of codes of a second type of signal in accordance with the values of quantities to be metered, said second type of signal having no effect on the supervisory and control sending and receiving means, metering selector means at the dispatching office connected to control the signal channel by the selection of said point and operable to produce a selection code comprised of signals of said second type, remote metering selector means connected by selection of the point to operate in response to the metering selection code to select one of the metering transmitters, and metering receiver means at the dispatching office connected by selection of the point to respond to the coded metering signals and indicate the value of the quantity metered.

9. In a control apparatus: a signal channel connecting a sending means to operate a line relay; said sending means operable to produce point selection codes comprised of signals of a predetermined type; said line relay responsive only to signals of said predetermined type; receiving means responsive to the operation of the line relay to selectively connect to the signal channel individual ones of a plurality of points in accordance with the different codes; a predetermined one of said points comprised of means for selecting individual ones of a plurality of operations to be performed in response to different ones of a plurality of codes comprised of signals of a type other than said predetermined type; control means for sending control codes comprised of said signals other than said predetermined type; said control means connected to send signals over the signal channel in response to the selection of said predetermined point by a point selection operation of the sending means.

10. In supervisory control equipment, sending means at a remote station operable to connect a signal channel to a direct current source to produce a point selection check code signal of a predetermined value and polarity in response to the receipt of a point selection code of said predetermined value and polarity over the signal channel from a dispatch office, a line relay connected to the channel operated by said check code, a rectifier device connected in circuit with the line relay to pass said point selection signals and said point selection check signals, digital converter means at the remote station, means including control means connected in shunt with the rectifier device by operation of the line relay in response to a particular point selection code operable to respond to selection codes comprised of signals of reverse polarity and below said predetermined value to selectively actuate different ones of the converter means in accordance with the selection code, and means operated by the converter means to apply a metering code signal of reverse polarity and below said predetermined value across the rectifier device.

References Cited in the file of this patent
UNITED STATES PATENTS

| | | |
|---|---|---|
| 2,091,301 | Boswau | Aug. 31, 1937 |
| 2,164,379 | Boswau | July 4, 1939 |
| 2,285,819 | Leathers | June 9, 1942 |
| 2,438,000 | Derr | Mar. 16, 1948 |
| 2,550,109 | Derr | Apr. 24, 1951 |
| 2,597,075 | Derr | May 20, 1952 |
| 2,616,959 | Breese et al. | Nov. 4, 1952 |
| 2,644,931 | Derr et al. | July 7, 1953 |
| 2,780,799 | Hansson | Feb. 5, 1957 |
| 2,901,728 | Breese | Aug. 25, 1959 |